United States Patent [19]

Harlan

[11] Patent Number: 4,525,988
[45] Date of Patent: Jul. 2, 1985

[54] COMBINE PLANTER IMPLEMENT

[76] Inventor: Dale Harlan, Hickman, Nebr. 68372

[21] Appl. No.: 524,406

[22] Filed: Aug. 18, 1983

[51] Int. Cl.³ .................. A01D 45/00; B60K 17/28
[52] U.S. Cl. ................................. 56/16.8; 56/13.5;
   56/14.6; 111/1
[58] Field of Search ............... 56/1, 13.5, 14.6, 16.8,
   56/DIG. 5, DIG. 9, 208; 111/1

[56] References Cited

U.S. PATENT DOCUMENTS

| | | | |
|---|---|---|---|
| 2,337,749 | 12/1943 | Hand | 56/DIG. 9 |
| 2,556,072 | 6/1951 | Dewey | 111/1 |
| 3,880,099 | 4/1975 | Houston et al. | 111/1 |
| 3,986,463 | 10/1976 | Houston et al. | 111/1 |
| 4,078,626 | 3/1978 | Weichel | 180/53 R |
| 4,206,581 | 6/1980 | Haake et al. | 56/14.6 |
| 4,229,931 | 10/1980 | Schlueter et al. | 56/208 |
| 4,236,581 | 12/1980 | Beckett | 171/56 |
| 4,266,489 | 5/1981 | Parramore | 111/1 |
| 4,327,541 | 5/1982 | Emory | 56/16.8 |

Primary Examiner—Gene Mancene
Assistant Examiner—David I. Tarnoff
Attorney, Agent, or Firm—Zarley, McKee, Thomte, Voorhees & Sease

[57] ABSTRACT

A planter attachment is installed on an agricultural combine between the throat portion and cutter head thereof. The planter attachment includes a transversely extended forward tool bar carried on a mounting frame adapted for connection to the cutter head attachment structure on a combine throat. An auxiliary cutter head attachment frame is also connected to the tool bar and positioned forwardly of the mounting frame for receiving and supporting a cutter head thereon. Individual planter units are mounted on at least one rearward tool bar which is supported relative to the forward tool bar by a parallelogram linkage to maintain the horizontal disposition of the planter units in response to pivotal movements of the combine throat. A pivotal robot structure on the mounting frame senses the ground position for adjusting the combine throat to maintain a uniform planting depth. The pivotal support for the auxiliary cutter head attachment frame enables independent adjustment of the cutting height.

27 Claims, 13 Drawing Figures 4,525,988

COMBINE PLANTER IMPLEMENT

BACKGROUND OF THE INVENTION

The present invention is directed generally to a planter attachment for an agricultural combine and more particularly to a planter attachment mounted on a combine between the cutter head and main drive wheels so that seeds are planted in the undisturbed ground behind the cutter head and forwardly of the rear trash discharge.

Whereas the broad concept of combining a harvester and planter has previously been suggested in Weichel U.S. Pat. No. 4,078,626, that patent disclosed a custom four-wheel drive tractor having four different work stations for mounting separate implements therealong. To the contrary, the present invention is directed to a planter attachment for conventional agricultural combines.

Many problems are encountered in attempting to attach a planter implement to an agricultural combine. First, whereas a planter implement could be pulled behind an agricultural combine, the trash discharged from the rearward end of the combine forms a ground cover which substantially interferes with planting and may result in a ten-percent loss of crop.

Severe space limitations are encountered in any attempt to mount a planter implement forwardly of the rear trash discharge. Associated with the severe space limitations is the limited access to any portion of the combine chasis on which a planter implement might be mounted. An associated problem is the support and manipulation of the heavy planter attachment as it is being installed on a combine.

The forward end of an agricultural combine presents a pivotally mounted throat adapted for connection to a cutter head. Since it is important that the longitudinally extended planter units be maintained at a generally constant orientation to the ground as they are raised and lowered, they are not readily adapted for attachment to a pivotal combine throat.

These and other problems are believed to be resolved by the combine planter implement of the present invention.

SUMMARY OF THE INVENTION

The combine planter implement of the present invention includes an elongated forward tool bar having a mounting frame connected thereto with means for attaching the mounting frame to the cutter head attachment means on the throat of the combine. An auxiliary cutter head attachment means is connected to the tool bar forwardly of the mounting frame for receiving and supporting a cutter head thereon. Thus the heavy planter implement is readily attached to a combine in the same manner that a cutter head is conventionally mounted thereon. The cutter head is then mounted on the auxiliary cutter head attachment means of the planter implement. Interposing the planter implement between the throat and cutter head of a combine has the added advantage of providing a forward extension of the combine throat to thereby provide additional space below it for the planter unit.

The individual planter units are mounted on rearward tool bars connected to the forward tool bar. Preferably, three rearward tool bars are provided, namely a center tool bar situated below the combine throat and two outer tool bars arranged outwardly of the opposite ends of the center tool bar. The outer tool bars are connected to the forward tool bars by a parallelogram linkage between the forward tool bar and combine chasis such that the orientation of the planter units on the outer tool bars remain uniform with respect to the ground in response to raising and lowering movements of the combine throat. Likewise, the center tool bar is connected to the forward tool bar by a pair of links which afford adjustment for the orientation of the planter units on the center tool bar and which maintain that adjusted orientation uniform relative to the ground in response to raising and lowering movements of the combine throat. The independent mounting of the center tool bar enables the planter units thereon to be positioned further rearwardly than the planter units on the outer tool bars for improved space utilization below the combine throat.

The present invention is also directed to a planter depth control mechanism for the combine. A pivotal robot on the cutter head has a pair of ground-engaging feelers which are operatively connected to the main hydraulic cylinders for raising and lowering the throat to assure a constant and uniform planting depth.

The present invention further contemplates a venturi adapted to be interposed along the seed delivery lines of an air planter unit for effectively doubling the number of individual planter units served by the air planter unit.

DESCRIPTION OF THE PREFERRED EMBODIMENT

Figure 1:
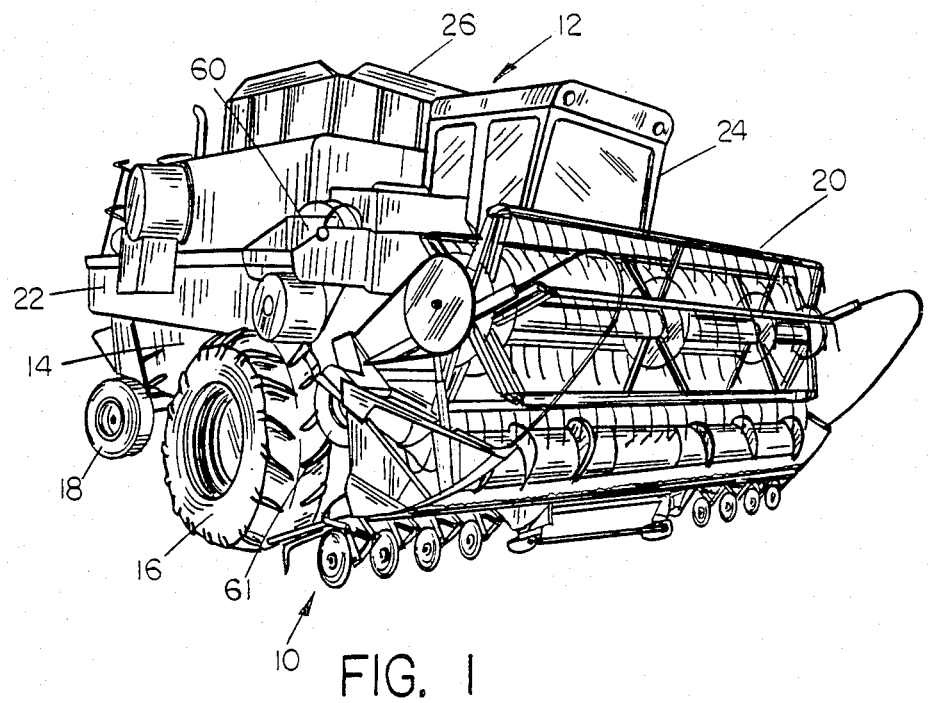
FIG. 1 is a perspective view of an agricultural combine with the planter attachment of the present invention mounted thereon.

The planter combine implement of the present invention is indicated generally at 10 in FIG. 1 in assembly relation with a conventional self-propelled agricultural combine 12. Combine 12 includes a chasis 14 supported on main front drive wheels 16 and rear steering wheels 18. A cutter head 20 is supported at the forward end of the combine for cutting the crop and conveying it to the throat which conveys the crop into the combine for separation of the grain from the straw and chaff which is discharged through the rear trash discharge 22. The combine includes the usual operator's cab 24 and the grain tank 26. Other details of the combine itself will be referred to herein with reference to other drawing figures.

Figure 2:
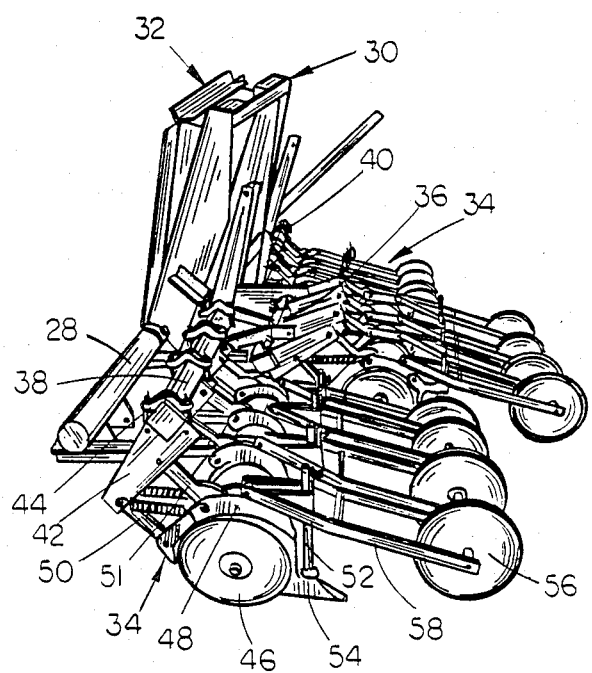
FIG. 2 is a side perspective view of the planter attachment of the invention.
Figure 3:
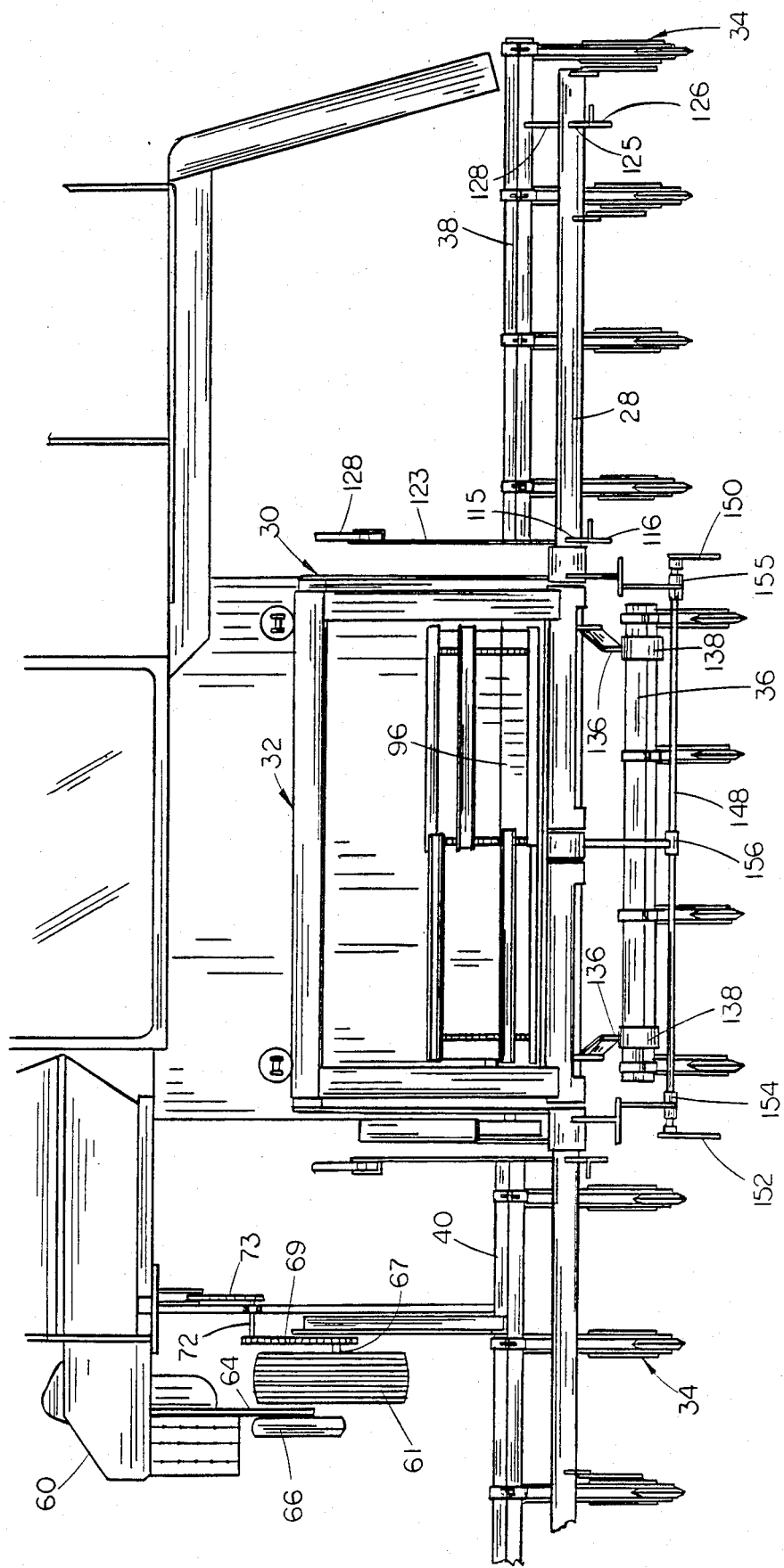
FIG. 3 is a front view of the combine and planter attachment with the cutter head removed for clarity.

The planter combine implement 10 is shown in FIGS. 2 and 3 as including a forward tool bar 28 pivotally connected to an inverted U-shaped mounting frame 30 and another inverted U-shaped auxiliary cutter head attachment frame 32. A plurality of individual planter units 34 are mounted on three rearward tool bars, namely a center tool bar 36 and outer tool bars 38 and 40. The connection of the rearward tool bars to forward tool bar 28 is an important feature of the present invention and is described in detail hereinbelow.

Each individual planter unit 34 is of conventional construction and includes a mounting plate 42 equipped with a clamp 44 for fixed attachment to a rearward tool bar. A pair of opener discs 46 are rotatably carried on a frame 48 which is connected by parallelogram links 50 and 51 to the mounting plate 42. Seed is delivered to an upstanding seed tube 52 supported on frame 48 and having a lower end carried on the skid plate 54. A press wheel 56 is pulled behind the frame 48 by a pivotal fork structure 58.

Figure 13:
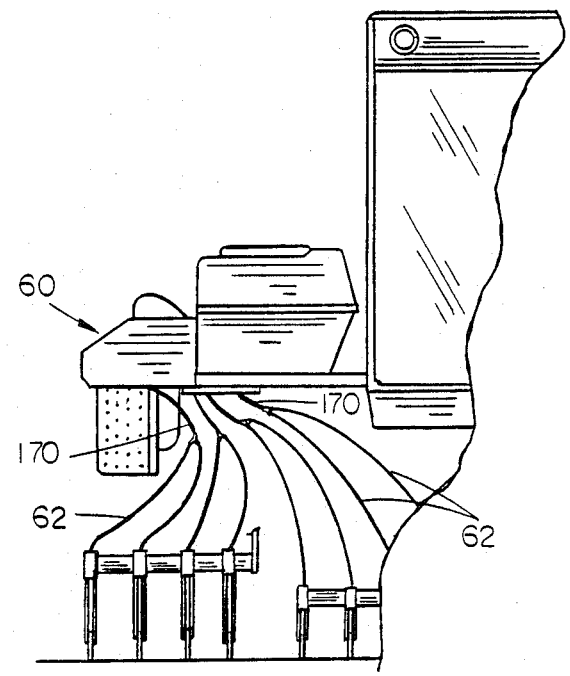
FIG. 13 is a partial front view of the seed delivery lines from the air planter to the individual planter units.

Seed is delivered to the seed tubes 52 from an air planter 60 through seed delivery tubes 62 (FIG. 13). Air planter 60 may be of the type commercially available from International Harvestor Corporation. The air planter 60 is driven by a drive wheel 61 which is rotatably carried on the end of a pivotal support arm 64 for engagement with the combine front drive wheel 16 and shown in FIG. 1. A weight 66 may be secured to the support arm 64 to maintain the drive wheel 62 and front wheel 16 in engagement. The drive wheel shaft 67 carries a sprocket which is coupled by chain 69 to an intermediate shaft 71 which is coupled by chain 73 to the air planter for releasing seeds in response to forward movement of the combine. The hydraulic driven fan motor of the air planter is propelled by a hydraulic motor operatively connected to a jack shaft protruding from the side of the combine rearwardly of the air planter location.

Figure 4:
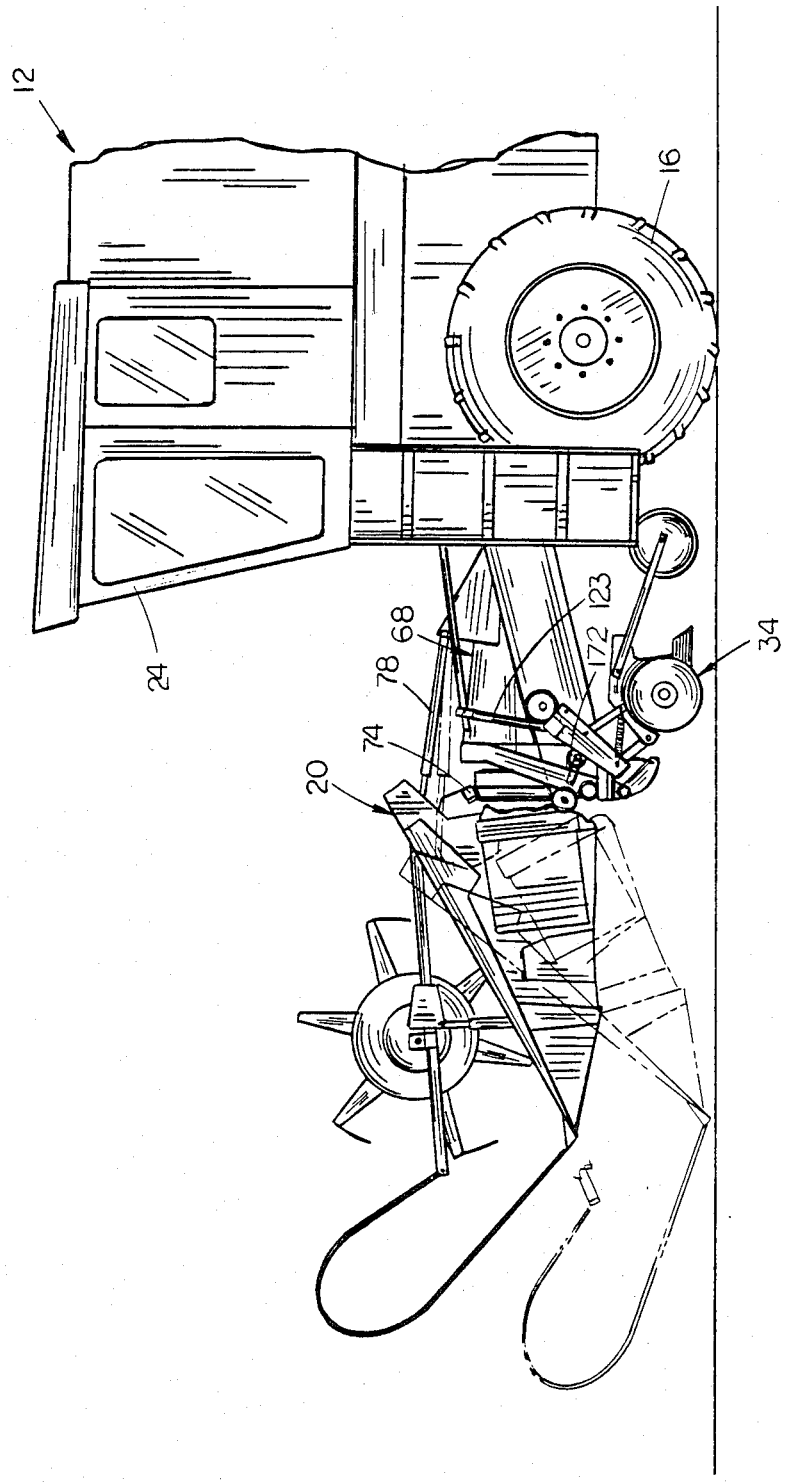
FIG. 4 is a partial side elevational view of the combine and planter assembly with dotted lines indicating the height adjustability of the cutter head while the planter units are held stationary.
Figure 6:
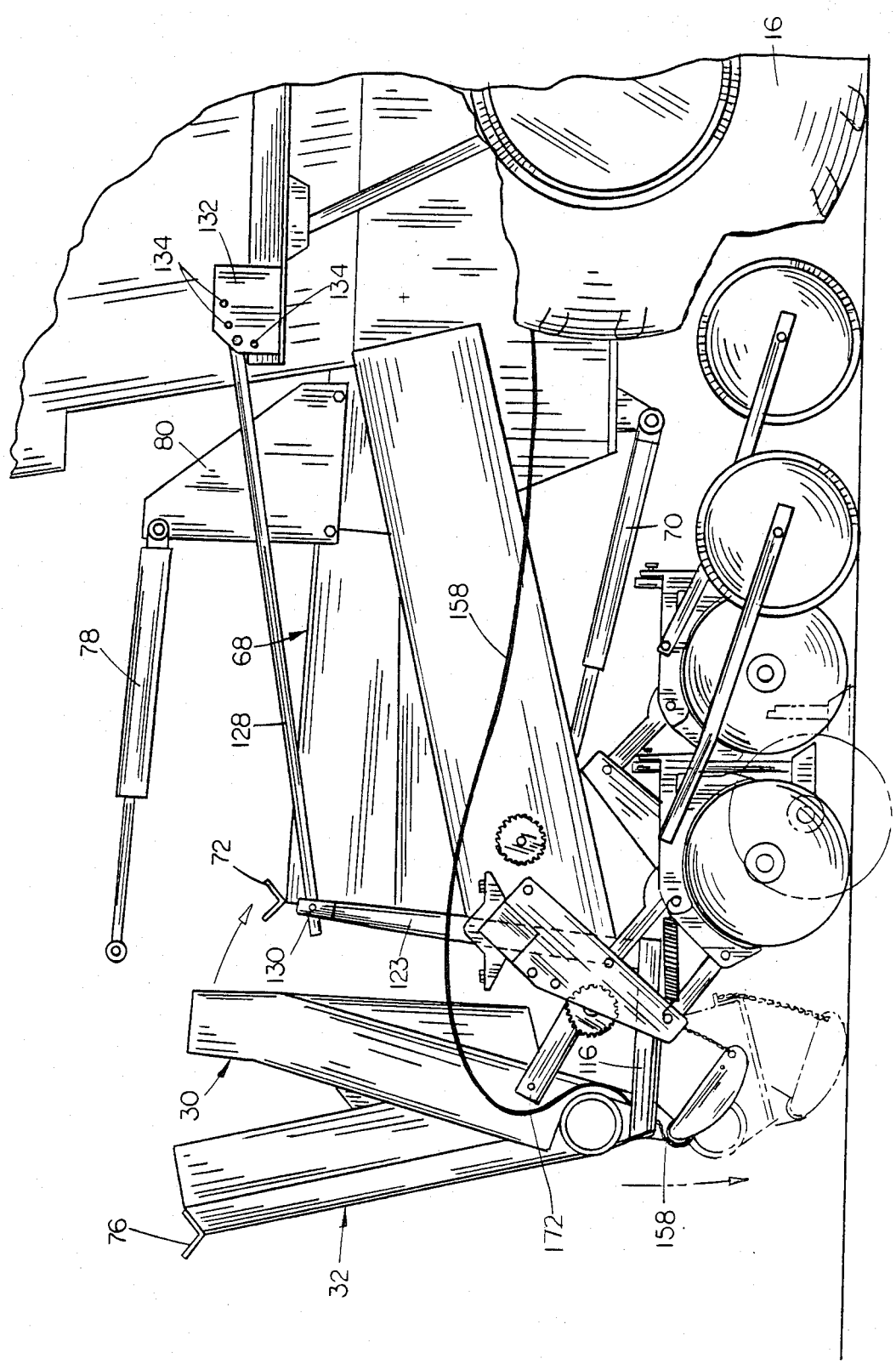
FIG. 6 is a partial side elevational view of the combine and planter attachment.

In FIGS. 4 and 6, it is seen that the combine 12 has a throat portion 68 pivotally connected to the chasis and extended forwardly therefrom. The throat receives crop material from the cutter head and conveys it into the combine. Up and down pivotal movement of the throat is controlled by a pair of lower hydraulic cylinders 70 which are arranged in transversely spaced relation so that only one is visible in the side view of FIG. 6. At the upper forward end of throat 68, an open topped V-shaped trough or channel is provided for receiving and supporting the cutter head 20 thereon. In FIG. 4, it is seen that the cutter head is provided with a transversely extended mounting bar 74 having a V-shaped lower surface adapted to seat upon channel 72. In accordance with the present invention, the mounting frame 30 of the planter implement 10 is mounted on channel 72 and the mounting bar 74 of cutter head 20 is seated within a similar channel or top cross member 76 on the auxiliary cutter head attachment frame 32. Pivotal movement of the cutter head 20 and auxiliary cutter head attachment frame 32 about the axis of the forward tool bar 28 is controlled by a pair of upper hydraulic cylinders 78 having rearward ends pivotally connected to a pair of upstanding plates 80 on throat portion 68 and forward ends pivotally connected to a pair of upstanding ears provided on the cutter head 20. Thus the cutter head 20 is pivotally raised and lowered in response to contraction and extension of upper hydraulic cylinders 78 as indicated by dotted lines in FIG. 4. The cutter head 20 is thus capable of being raised and lowered independently of the throat portion 68 for adjusting the cutting height of the cutter head 20.

Figure 8:
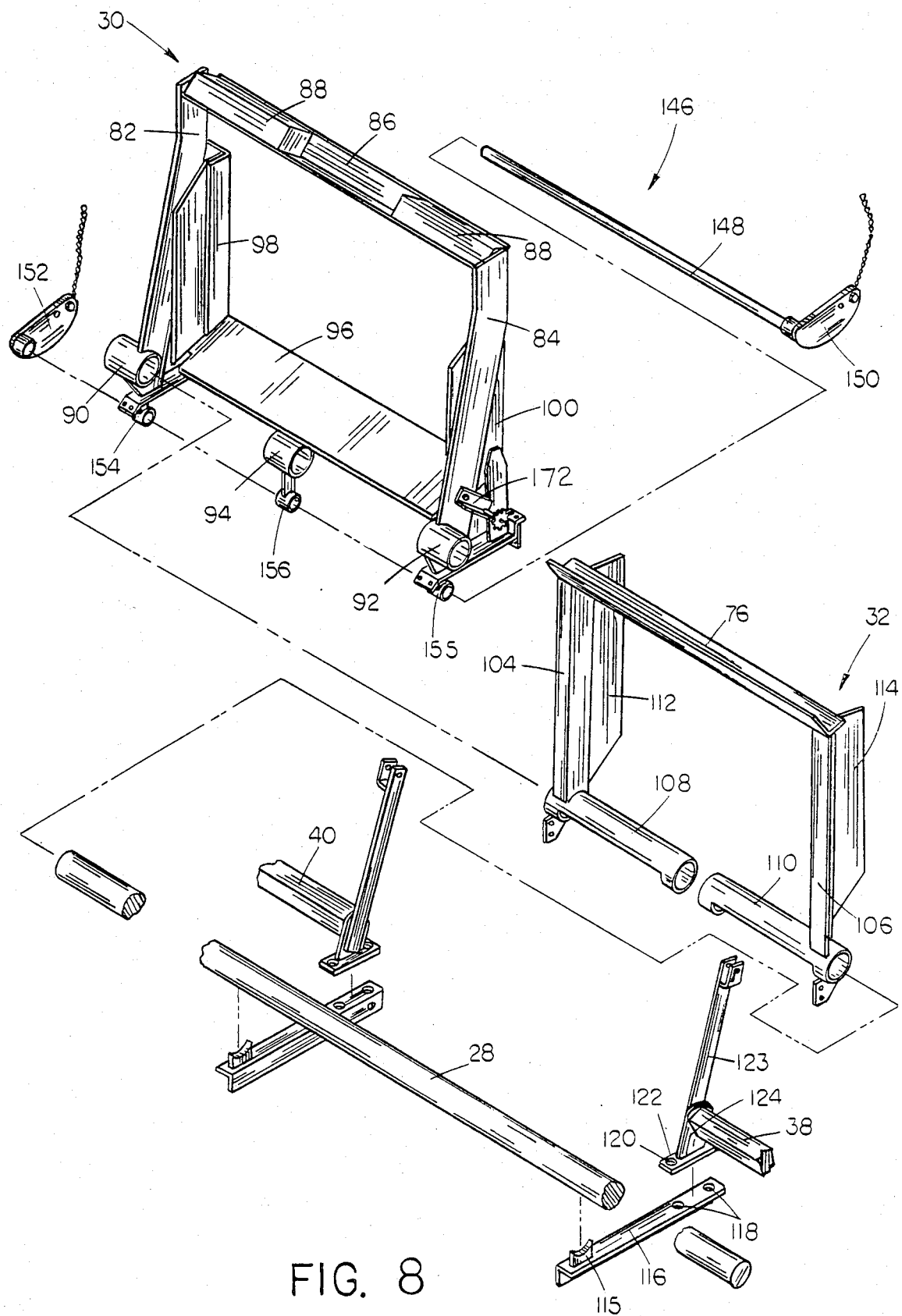
FIG. 8 is an exploded perspective view of the forward tool bar, the mounting frame, the auxiliary cutter head attachment frame, rearward tool bar support arms and robot.
Figure 9:
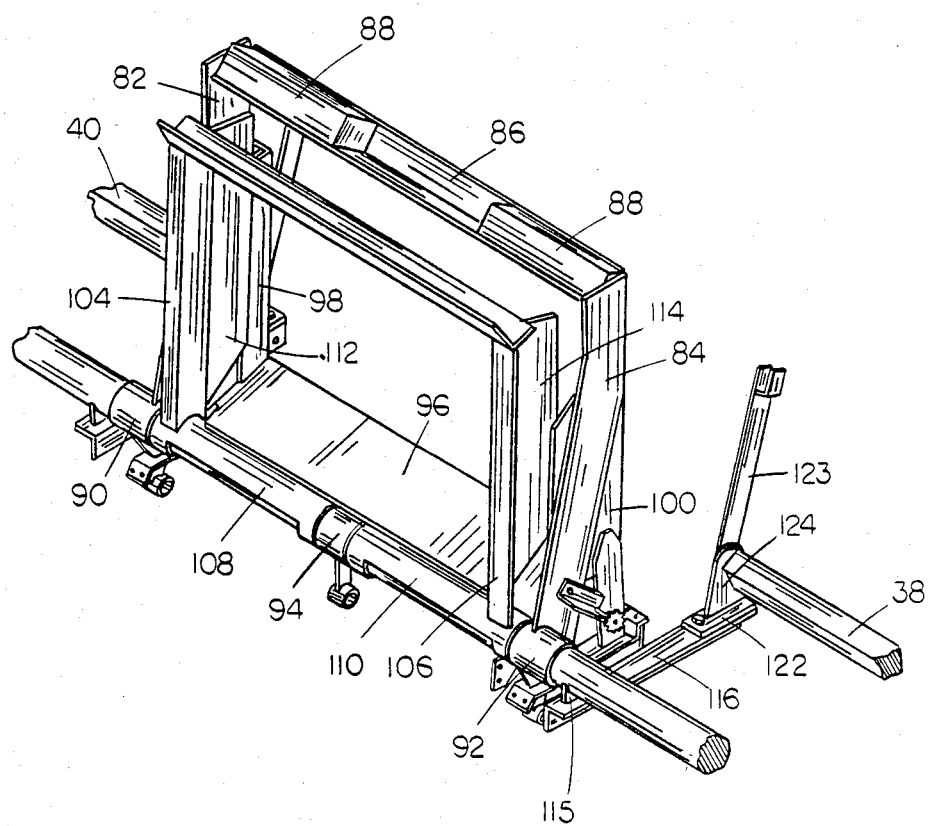
FIG. 9 is a perspective view showing the parts of FIG. 8, other than the robot, in assembled relation.
Figure 10:
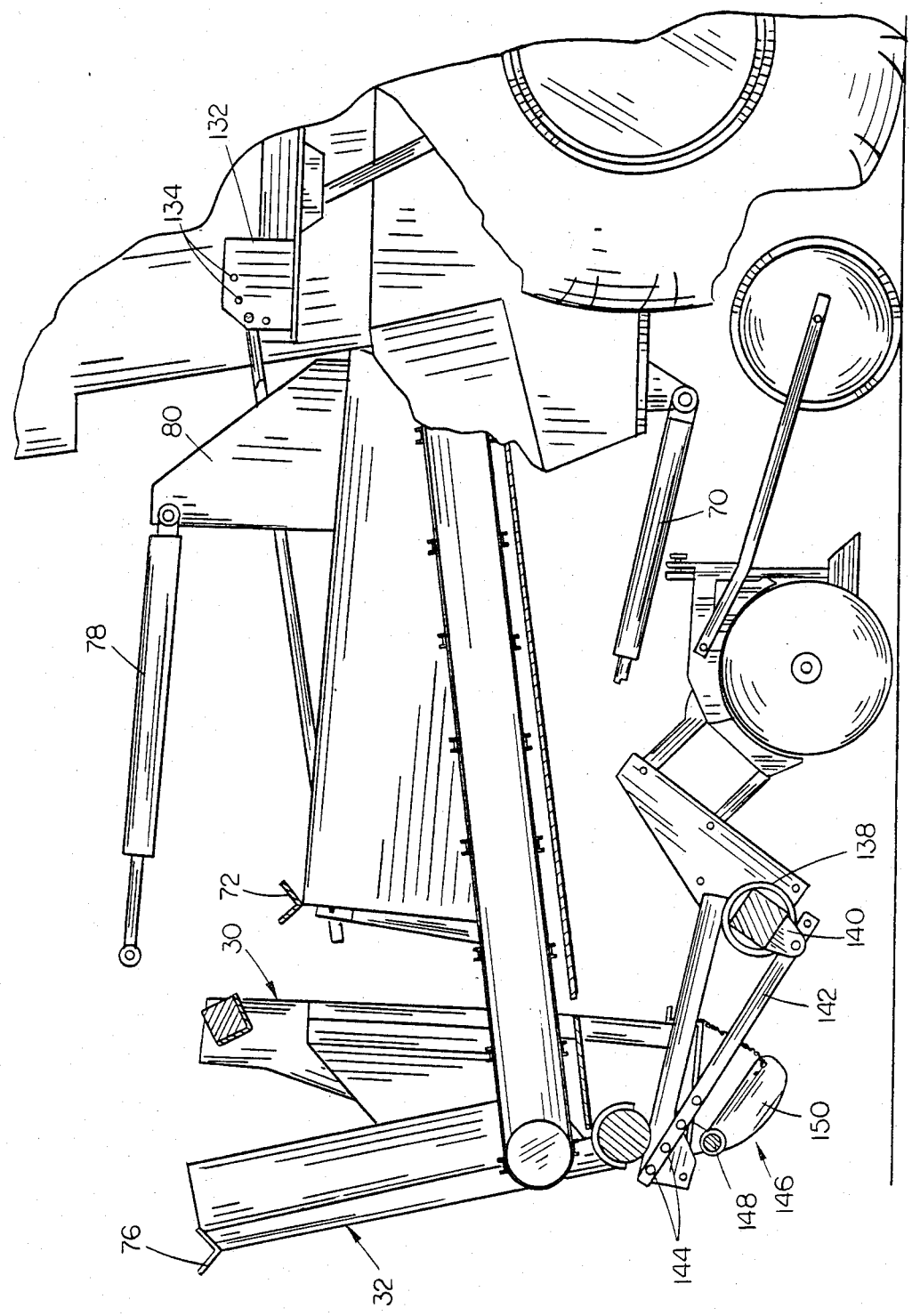
FIG. 10 is a partially sectional side elevational view of the combine and planter attachment with portions broken away for clarity.

Reference is made to FIGS. 8 and 9 for a detailed description of the mounting frame 30 and auxiliary cutter head attachment frame 32. Mounting frame 30 is an inverted generally U-shaped yoke having a pair of upstanding legs 82 and 84 having upper ends interconnected by a top cross bar 86. Bar 86 is a channel member oriented to present a V-shaped lower surface for seating on the throat portion channel 72. Reinforcing members 88 are welded onto opposite ends of the top cross bar 86 to strengthen it since this member carries substantially the entire weight of the planter implement and cutter head. The lower ends of legs 82 and 84 are provided with aligned sleeve portions 90 and 92 which coact with a central sleeve portion 94 to pivotally support mounting frame 30 on the forward tool bar 28. A bottom plate 96 interconnects the lower ends of legs 82 and 84 and is rigidly connected to them as are side gussets 98 and 100 to form a rigid assembly. Bottom plate 96 is arranged generally tangent to forward tool bar 28 as shown in FIG. 10 to thereby provide a forward extension for the crop conveying surface 102 of the combine throat portion 68.

The auxiliary cutter head attachment frame 32 is also shown as an inverted U-shaped yoke including a pair of upstanding legs 104 and 106 having upper ends interconnected by the top cross member channel 76. The lower ends of legs 104 and 106 are connected to elongated sleeve portions 108 and 110 respectively which are only semicircular through most of their length for providing access to the underside of the tool bar 28. Sleeve portions 108 and 110 are designed to fit in aligned relation between the sleeve portions 90,92 and 94 of mounting frame 30. Gusset plates 112 and 114 are provided on legs 104 and 106 for strength.

The lowermost portion of FIG. 8 illustrates the connection of the outer tool bars 38 and 49 to the forward tool bar 28. Since outer tool bar 40 is constructed as the mirror image of outer tool bar 38, only the latter will be explained in detail. After the forward tool bar 28 is extended through the sleeve portions of the mounting frame 30 and auxiliary cutter head support frame 32 as shown in FIG. 9, and upstanding saddle bracket 115 of a rearwardly extended support arm 116 is welded to the underside of thetoolbar 28. The rearward end of arm 116 has a pair of holes 118 adapted for registration with holes 120 of a mounting bracket 122 having an upstanding flange 124 fixed to the interior end of outer tool bar 38. A second arm 126 is secured to flange 124 and extends upwardly therefrom for a purpose described below. A similar support arm 126 having a saddle bracket 125 is secured to the underside of the tool bar adjacent the outer end thereof. A knotched flange 128 on the rearward end of support arm 126 is welded to the underside of outer tool bar 38 to support the outer end thereof. The outer tool bar support arms 116 and 126 are thus pivotally movable is unison with forward tool bar 28.

Referring to FIG. 6, it is seen that rearward support arm 116 and upstanding arm 123 coact as the first link of a parallelogram linkage with the combine throat portion 68. An elongated second link 128 has its forward end pivotally connected to upper arm 123 at 130 and its rearward end pivotally connected to an upstanding mounting plate 132 on the combine chasis 14. Mounting plate 132 is provided with a plurality of holes 134 whereby the orientation of the rearward tool bar to the forward tool bar may be adjusted within a finite range.

The parallelogram linkage operates to maintain the outer tool bars and the planter units mounted thereon in a uniform orientation with respect to the ground in response to raising and lowering movements of the combine throat portion 68. This is critical to assure effective and efficient planting. It can be seen in FIG. 6 that when the throat portion 68 is pivotted upwardly by lower cylinders 70, second link 128 operates to pivot the first link 116, 123 forwardly to maintain the horizontal disposition of the planter units 34. Note that forward pivotal movement of first link 116,123 results in a slight counterclockwise rotation of forward tool bar 28.

Figures 5, 7:
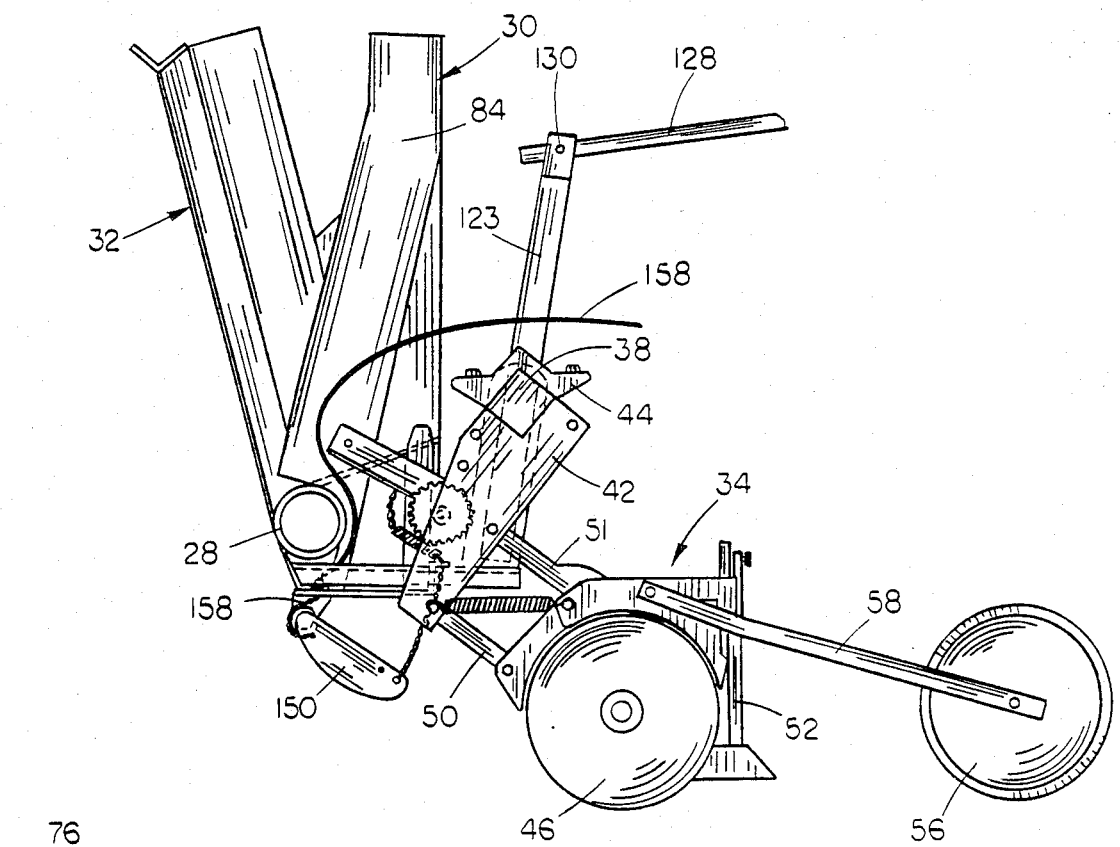
FIG. 5 is a side elevational view showing the connection of a planter unit to one of the outer tool bars.
FIG. 7 is a partially sectional side elevational view showing the attachment of a planter unit to the center tool bar of the planter attachement.

FIG. 5 further illustrates the connection of outer tool bar 38 to forward tool bar 28 and the connection of the individual planter units 34 to the outer tool bar 38.

FIGS. 7 and 10 illustrate the connection of the center tool bar 36 to forward tool bar 28. A pair of rearwardly extended support arms 136 have their forward ends welded to the underside of forward tool bar 28 and rearward ends welded to respective sleeve members 138. Only a single support arm 136 is seen in FIGS. 7 and 10 since they are arranged in transversely spaced relation but their relative positions can be seen in the front view of FIG. 3. Referring again to FIG. 7, the generally square section center tool bar 36 is rotatably supported within the sleeve members 138. A depending flange 140 on center tool bar 36 is pivotally connected to the rearward end of a lower link 142, the forward wnd of which is bolted to the forward end of support arm 136. A plurality of longitudinally spaced apart holes 144 are provided in the lower link 142 for adjustably fixing the pivoted position of the center tool bar 36 relative to the forward tool bar 28. Accordingly, it is seen that the center tool support arms 136 are pivotally movable in unison with the support arms 116 and 126 for the outer tool bars since all of the support arms are rigidly connected to the underside of forward tool bar 28. The horizontal orientation of the planter units 34 mounted on the center tool bar 36 will remain uniform when the combine throat portion 68 is raised and lowered.

Note that the individual planter units mounted on the center tool bar differ from the planter units connected to the outer tool bars only by the inverted mounting of the mounting plate 42 due to the lower position of the center tool bar 36 relative to the outer tool bars 38 and 40. This lower position of the center tool bar prevents abutment of the planter units with the underside of the throat portion 68 which is positioned directly above the planter units of the center tool bar.

Referring to the upper right hand corner of FIG. 8, there is shown a robot structure 146 which is operative for controlling pivotal movement of the combine throat portion 68 to assure uniform planting depth. Robot structure 146 includes an elongated shaft 148 having a pair of rearwardly extended ground engaging foot members 150 and 152 on the opposite ends thereof. Shaft 148 is pivotally supported within three sleeve portions 154, 155 and 156 which are supported by brackets depending from the mounting frame sleeves 90. 92 and 94. The rearward ends of the foot members 150 and 152 are connected to brackets 158 at each lower corner of the mounting frame for limiting the extent of downward pivotal movement of the foot members as shown in dotted lines in FIG. 6. The forward ends of the foot members are connected by a throttle cable 158 to the hydraulic actuator for the throat portion cylinders 70.

Figure 11:
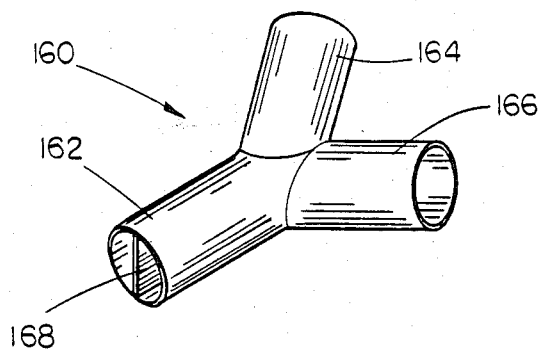
FIG. 11 is a perspective view of the venturi of the invention.
Figure 12:
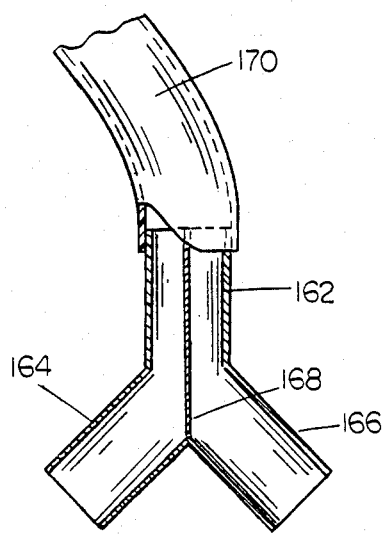
FIG. 12 is a partially sectional and cut away view of the venturi connected to a seed supply line.

Referring to FIGS. 11-13, there is shown a novel venturi for dividing seed flow through a single seed tube to two separate delivery tubes. Venturi 160 includes an inlet tube 162 which merges with and opens into a pair of outlet tubes 164 and 166. A divider wall 168 extends centrally through the inlet tube to the juncture of the outlet tubes as shown in FIG. 12. It is preferred that the exposed end of divider wall 168 be sharpened and that the peripheral edge of the inlet tube be tapered to minimize interference with seed flow therethrough.

FIG. 13 shows four of the seed delivery hoses for the six row air planter unit 60. A venturi 160 is fitted into the free end of each of the hoses 170 with divider hoses 62 connected to the outlet tubes 164 and 166 so that each seed delivery hose 170 services two individual planter units 34.

In operation, the planter implement 10 of the present invention may be easily lifted by a tractor front end loader or the like and placed onto the throat portion 68 of a combine 12 in the same manner that a cutter head is conventionally mounted thereon. The cutter head 20 is then installed onto the auxiliary cutter head frame in the same manner. Installation is completed by connection of the upper hydraulic cylinders 78 to the cutter head 20. The operator may then manually actuate the lower hydraulic cylinders 70 to raise the combine throat portion 68 for transport. The parallelogram linkage which connects the rearward tool bars to the forward tool bar assures that the planter units remain level as the throat is pivoted upwardly and downwardly.

In the field, the throat portion 68 is lowered to position the planters at the desired planting depth and the auxiliary cutter head attachment frame is pivoted to adjust the cutting height for the cutter head 20. As the combine moves forwardly, the harvested crop is conveyed from the cutter head up through the mounting frame 30 where it is engaged by the rattle or drag chain of the combine throat. For this purpose, it is preferred to modify the drag chain conveyor of the throat by extending it forwardly slightly beyond the forward edge of the mounting frame bottom plate 96 to assure efficient crop delivery to the throat portion. The implement is also provided with a pivotally mounted chain tightener sprocket assembly 172 (FIGS. 4, 6 and 8) for maintaining tension in the drive chain extending between the header and throat.

At the same time that crop is being harvested, the main drive wheels rotate the air planter unit drive wheel 62 which causes seeds to be distributed through the seed delivery hoses to the individual planter units 34. Thus on a single pass through the field, one crop is harvested and the next is planted.

The arrangement of the individual planter units ahead of the combine wheels accommodates no-till planting in undisturbed soil. Since the planters are arranged forwardly of the trash discharge, the planters need not cut through any ground cover and the straw and chaff which are discharged from the rearward end of the combine provide a ground cover for the newly planted seed to assure moisture retention. By combining and planting simultaneously, fuel is conserved, considerable labor is saved at this very labor short time of year and valuable growing days are added for the late planted crop which is so essential to crop maturity in double cropping.

I claim:

1. A planter attachment for an agricultural combine having a chasis, front drive wheels supporting said chasis, a rear trash discharge, a throat portion pivotally connected to said chasis and extended forwardly of the front wheels, a cutter head attachment means on said throat portion, and a cutter head adapted for attachment to said cutter head attachment means, comprising,
    an elongated forward tool bar,
    a plurality of planter units,
    means for supporting said plurality of planter units in generally uniformly transversely spaced relation along said forward tool bar,
    a mounting frame connected to the forward tool bar, said mounting frame including means attaching said mounting frame to the cutter head attachment means of a combine, and
    auxiliary cutter head attachment means connected to said tool bar and positioned forwardly of said mounting frame for receiving and supporting a cutter head thereon.

2. The planter attachment of claim 1 wherein said auxiliary cutter attachment means is pivotally connected to said first tool bar for raising and lowering movements of a cutter head relative to said forward tool bar.

3. A planter attachment for an agricultural combine having a chassis, front drive wheels supporting said chassis, a rear trash discharge, a throat portion pivotally connected to said chassis and extended forwardly of the front wheels, a cutter head attachment means on said throat portion, and a cutter head adapted for attachment to said cutter head attachment means, comprising,
    an elongated forward tool bar,
    a plurality of planter units,
    means for supporting said plurality of planter units in generally uniformly transversely spaced relation along said forward tool bar,
    a mounting frame connected to the forward tool bar, said mounting frame including means attaching said mounting frame to the cutter head attachment means of a combine, said mounting frame comprising a generally inverted U-shaped yoke including a pair of upstanding legs having upper and lower ends, a top cross bar connected between said upper ends and said lower ends being pivotally connected to said forward tool bar, and
    auxiliary cutter head attachment means connected to said tool bar and positioned forwardly of said mounting frame for receiving and supporting a cutter head thereon.

4. The planter attachment of claim 3 wherein said mounting frame further comprises a bottom plate connected to and extended between said lower ends of said legs thereby to provide a forward extension for the combine throat.

5. The planter attachment of claim 3 wherein said top cross bar has a V-shaped bottom surface, said means for attaching said mounting frame to the cutter head attachment means of a combine comprising said V-shaped bottom surface.

6. The planter attachment of claim 3 wherein said auxiliary cutter head attachment means comprises a generally inverted U-shaped yoke including a pair of upstanding legs having upper ends and lower ends pivotally connected to said first tool bar, and a top cross bar connected between said upper ends.

7. The planter attachment of claim 6 wherein said top cross bar of said auxiliary cutter attachment means has a top surface defining a generally elongated V-shaped trough for receiving and supporting a cutter head thereon.

8. The planter attachment of claim 1 wherein said means for supporting said plurality of planter units comprises at least one rearward tool bar, a plurality of said planter units being mounted on said rearward tool bar in transversely spaced-apart relation, a parallelogram linkage connecting said forward tool bar to said combine chasis and throat, said rearward tool bar being mounted on said parallelogram linkage such that a uniform orientation of said rearward tool bar to the ground is maintained in response to pivotal movement of the combine throat.

9. The planter attachment of claim 8 wherein said parallelogram linkage includes a first link connected to said forward tool bar and extended generally vertically therefrom, a second link having a forward end pivotally connected to said first link and a rearward end adapted for connection to a combine chasis at a position such that said second link is disposed parallel to the combine throat, said rearward tool bar being mounted on said first link.

10. The planter attachment of claim 9 wherein said first link is a generally L-shaped member comprising a first arm extended rearwardly from said forward tool bar and a second arm extended upwardly from said first arm, said rearward tool bar being connected to the first link adjacent the apex thereof.

11. The planter attachment of claim 8 comprising three rearward tool bars including a center tool bar and two outer tool bars positioned at opposite ends of the center tool bar, said outer tool bars being mounted on said parallelogram linkage, and second linkage means connecting said center tool bar to said forward tool bar for pivotal movement therewith.

12. The planter attachment of claim 11 wherein said second linkage means comprises a pair of upper arms rigidly connected to said forward tool bar and extended rearwardly therefrom, a pair of sleeve members on the rearward ends of said upper arms, said center tool bar being pivotally supported in said pair of sleeve members and having a pair of depending flanges connected by a pair of length adjustable lower arms to the forward ends of said upper arms.

13. The planter attachment of claim 1 further comprising a robot structure mounted below said mounting frame, said robot structure including an upright elongated feeler arm having a forward end pivotally connected to said mounting frame, means for limiting downward pivotal movement of the rear end thereof and means responsive to pivotal movement of the feeler arm for actuating hydraulic controls of a combine.

14. In combination, an agricultural combine having a chasis, front drive wheels supporting said chasis, a rear trash discharge, a throat portion pivotally connected to said chasis and extended forwardly of the front drive wheels, a cutter head attachment means on said throat portion, a planter attachment comprising,
an elongated forward tool bar,
a plurality of planter units,
means for supporting said plurality of planter units in generally uniformly transversely spaced relation along said forward tool bar,
a mounting frame connected to the forward tool bar, said mounting frame being attached to the cutter head attachment means of the combine, and
auxiliary cutter head attachment means connected to said tool bar and positioned forwardly of the mounting frame,
a cutter head supported on said auxiliary cutter head attachment means.

15. The combination of claim 14 wherein said auxiliary cutter attachment means is pivotally connected to said forward tool bar for raising and lowering movements of said cutter head relative to said forward tool bar.

16. In combination,
an agricultural combine having a chassis, front drive wheels supporting said chassis, a rear trash discharge, a throat portion pivotally connected to said chassis and extended forwardly of the front drive wheels, a cutter head attachment means on said throat portion,
a planter attachment comprising,
an elongated forward tool bar,
a plurality of planter units,
means for supporting said plurality of planter units in generally uniformly transversely spaced relation along said forward tool bar,
a mounting frame connected to the forward tool bar, said mounting frame being attached to the cutter head attachment means of the combine, said mounting frame comprising a generally inverted U-shaped yoke including a pair of upstanding legs having upper and lower ends, a top cross bar connected between said upper ends and said lower ends being pivotally connected to said forward tool bar, and
auxiliary cutter head attachment means connected to said tool bar and positioned forwardly of the mounting frame,
a cutter head supported on said auxiliary cutter head attachment means.

17. In combination,
an agricultural combine having a chassis, front drive wheels supporting said chassis, a rear trash discharge, a throat portion pivotally connected to said chassis and extended forwardly of the front drive wheels, a cutter head attachment means on said throat portion,
a planter attachment comprising,
an elongated forward tool bar,
a plurality of planter units,
means for supporting said plurality of planter units in generally uniformly transversely spaced relation along said forward tool bar,
a mounting frame connected to the forward tool bar, said mounting frame being attached to the cutter head attachment means of the combine, and
auxiliary cutter head attachment means connected to said tool bar and positioned forwardly of the mounting frame,
a cutter head supported on said auxiliary cutter head attachment means,
said throat portion having a crop conveyor surface thereon and said mounting frame further comprising a bottom plate connected to and extended between said lower ends of said legs, said bottom plate being generally aligned with said crop conveyor surface and providing a forward extension thereof.

18. The combination of claim 16 wherein said cutter head attachment means comprises a transversely extended V-shaped trough and wherein said top cross bar has a coacting V-shaped bottom surface seated in said trough.

19. The combination of claim 16 wherein said auxiliary cutter head attachment means comprises a generally inverted U-shaped yoke including a pair of upstanding legs having upper ends and lower ends pivotally connected to said first tool bar, and a top cross bar connected between said upper ends.

20. The combination of claim 16 wherein said top cross bar of said auxiliary cutter attachment means has a top surface defining a generally elongated V-shaped trough, said cutter head being seated and supported on said trough.

21. The combination of claim 14 wherein said means for supporting said plurality of planter units comprises at least one rearward tool bar, a plurality of said planter units being mounted on said rearward tool bar in transversely spaced-apart relation, a parallelogram linkage connecting said forward tool bar to said combine chasis and throat, said rearward tool bar being mounted on said parallelogram linkage such that a uniform orientation of said rearward tool bar to the ground is maintained in response to pivotal movement of the combine throat.

22. The combination of claim 21 wherein said parallelogram linkage includes a first link connected to said forward tool bar and extended generally vertically therefrom, a second link having a forward end pivotally connected to said first link and a rearward end pivotally connected to the combine chasis at a position such that second link is disposed parallel to the combine throat portion, said rearward tool bar being mounted on said first link.

23. The combination of claim 22 wherein said first link is a generally L-shaped member comprising a first arm extended rearwardly from said forward tool bar and a second arm extended upwardly from said first arm, said rearward tool bar being connected to the first link adjacent the apex thereof.

24. In combination,
an agricultural combine having a chasis, front drive wheels supporting said chasis, a rear trash discharge, a throat portionpivotally connected to said chasis and extended forwardly of the front drive wheels and a cutter head connected to the throat portion for delivering crop material thereto,
an elongated forward tool bar,
means for supporting said forward tool bar on said throat portion adjacent the forward end thereof,
a rearward tool bar, a plurality of planter units being mounted on said rearward tool bar in transversely spaced-apart relation, a parallelogram linkage connecting said forward tool bar to said combine chasis and throat, said rearward tool bar being mounted on said parallelogram linkage such that a uniform orientation of said rearward tool bar to the ground is maintained in response to pivotal movement of the combine throat.

25. The combination of claim 24 wherein said parallelogram linkage includes a first link connected to said forward tool bar and extended generally vertically therefrom, a second link having a forward end pivotally connected to said first link and a rearward end adapted for connection to a combine chasis at a position such that said second link is disposed parallel to the combine throat, said rearward tool bar being mounted on said first link.

26. The combination of claim 25 wherein said first link is a generally L-shaped member comprising a first arm extended rearwardly from said forward tool bar and a second arm extended upwardly from said first, said rearward tool bar being connected to the first link adjacent the apex thereof.

27. A method of supporting a planter implement on an agricultural combine having a chasis, front drive wheels supporting said chasis, a rear trash discharge, a throat portion pivotally connected to said chasis and extended forwardly of the front wheels, a cutter head attachment means on said throat portion, and a cutter head adapted for attachment to said cutter head attachment means, comprising, mounting said planter implement on said cutter head attachment means, providing said planter implement with auxiliary cutter head attachment means, and mounting said cutter head on said auxiliary cutter head attachment means.

* * * * *